United States Patent [19]

Ueshima et al.

[11] Patent Number: 5,502,095
[45] Date of Patent: Mar. 26, 1996

[54] THERMOPLASTIC ELASTOMER COMPOSITION

[75] Inventors: Toshihumi Ueshima; Ko Hasegawa; Toshio Teramoto, all of Yokkaichi; Tatsuo Nakajima, Iwata; Takeyoshi Konomoto, Kakegawa, all of Japan

[73] Assignees: Japan Synthetic Rubber Co., Ltd., Tokyo; NTN Corporation, Osaka, both of Japan

[21] Appl. No.: 145,615

[22] Filed: Nov. 4, 1993

[30] Foreign Application Priority Data

Nov. 6, 1992 [JP] Japan ................ 4-297062

[51] Int. Cl.⁶ ........................................... C08K 5/54
[52] U.S. Cl. ................ 524/269; 524/267; 525/101
[58] Field of Search ....................... 524/267, 269, 524/268; 525/101

[56] References Cited

U.S. PATENT DOCUMENTS

| 3,963,802 | 6/1976 | Smith . | |
|---|---|---|---|
| 4,141,863 | 2/1979 | Coran et al. . | |
| 4,290,927 | 9/1981 | Tanaka et al. . | |
| 4,367,316 | 1/1983 | Tanaka et al. . | |
| 4,879,331 | 11/1989 | Endo | 524/267 |

FOREIGN PATENT DOCUMENTS

| 0308871 | 3/1989 | European Pat. Off. . | |
|---|---|---|---|
| 0506465 | 9/1992 | European Pat. Off. . | |
| 2640632 | 6/1990 | France | 524/267 |
| 52-138546 | 11/1977 | Japan . | |

OTHER PUBLICATIONS

Patent Abstracts of Japan, vol. 12, No. 398 (C–538)[3245], Oct. 21, 1988, JP–A–63-142056, Jun. 14, 1988.

*Primary Examiner*—Ralph H. Dean
*Attorney, Agent, or Firm*—Oblon, Spivak, McClelland, Maier & Neustadt

[57] ABSTRACT

A thermoplastic elastomer composition comprising (A) 50–98% by weight of a thermoplastic polyester elastomer, (B) 50–2% by weight of a rubber and (C) a polyorganosiloxane in a proportion of 0.01–10 parts by weight per 100 parts of the total of the components (A) and (B). The above thermoplastic elastomer composition enables one to improve the flexibility and compression set of the thermoplastic polyester elastomer excellent mechanical properties, heat resistance and oil resistance without impairing the abrasion resistance of the thermoplastic polyester elastomer.

15 Claims, No Drawings

THERMOPLASTIC ELASTOMER COMPOSITION

BACKGROUND OF THE INVENTION

This invention relates to a thermoplastic elastomer composition, the flexibility and compression set of which has been improved without impairing the abrasion resistance.

Thermoplastic polyester elastomers are multi-block copolymers having, in the polymer main chain, polyester- and polyether-recurring units or polyester-and polyester-recurring units, and are excellent in mechanical properties, heat resistance and oil resistance.

The thermoplastic polyester elastomers have such excellent characteristics, but have such drawbacks that the hardness is high and the flexibility is poor. In addition, they have a large compression set, so that their use in wider applications has been restricted.

In order to solve these problems, there has been provided a thermoplastic elastomer, the flexibility and compression set of which have been improved by blending a rubber component, and the thermoplastic elastomer is suitable as a material for automobile parts, particularly for joint boots.

However, since the above thermoplastic elastomer is flexibilized by blending a rubber component therewith, it is particularly inferior in abrasion resistance and such a further problem is caused in some cases that the molded articles of the thermoplastic elastomer are worn by being rubbed with one another or with other parts and finally become unusable.

In particular, when the molded articles are used in joint boots, there is such a problem that the bellow portions thereof are rubbed with one another to be broken.

As mentioned above, thermoplastic polyester elastomers are excellent in mechanical properties, heat resistance, oil resistance and the like; however, when a rubber component is blended therewith for improving the flexibility and compression set thereof, such new problems are caused that the abrasion resistance is lowered and when molded articles thereof are rubbed with one another or with other parts they are broken.

SUMMARY OF THE INVENTION

This invention aims at solving the above problems and provides, for this purpose, a thermoplastic elastomer composition which comprises (A) 50–98% by weight of a thermoplastic polyester elastomer and (B) 50–2% by weight of a rubber and (C) a polyorganosiloxane in a proportion of 0.01–10 parts by weight per 100 parts by weight of the total of the component (A) and the component (B).

DETAILED DESCRIPTION OF THE INVENTION

The thermoplastic polyester elastomer which is the component (A) of this invention is a polyester block copolymer, and has, in its main chain, (A-1) a high melting crystalline segment consisting mainly of an aromatic polyester unit and (A-2) a low melting polymer segment consisting mainly of an aliphatic polyether unit and/or an aliphatic polyester unit.

The aromatic polyester unit of the high melting crystalline segment (A-1) which is a hard segment is formed from an acid component and a glycol component. The acid component is substantially terephthalic acid and/or 2,6-naphthalenedicarboxylic acid.

In addition to the terephthalic acid and/or 2,6-naphthalenedicarboxylic acid, other aromatic dicarboxylic acids such as isophthalic acid and the like or aliphatic dicarboxylic acids such as adipic acid, sebacic acid, cyclohexane-1,4-dicarboxylic acid, dimeric acid and the like may be co-used in a small amount.

The glycol component constituting the aromatic polyester unit is a glycol having 2 to 12 carbon atoms, for example, ethylene glycol, propylene glycol, tetramethylene glycol, neopentyl glycol, hexanediol, decanediol or the like.

The lower limit of the melting point of the high melting crystalline segment (A-1) is not critical; however, it is preferably 150° C., more preferably 170° C., and most preferably 190° C.

The aliphatic polyether unit constituting the low melting polymer segment (A-2) which is a soft segment is formed of polyalkylene glycol, and specific examples thereof include, for example, polyethylene glycol, polypropylene glycol, polytetramethylene glycol, polyethylene glycol-polypropylene glycol block copolymer and the like, and polytetramethylene glycol is particularly preferable.

These polyalkylene glycols may be used alone or in admixture as far as they have a carbon to oxygen ratio of 2–4.5.

The aliphatic polyester unit which is another constituent of the low melting polymer segment (A-2) is composed mainly of an aliphatic dicarboxylic acid and a glycol, and the dicarboxylic acid which is the main acid component is, for example, succinic acid, adipic acid, sebacic acid, decanedicarboxylic acid or the like.

In addition to the aliphatic dicarboxylic acid, an aromatic dicarboxylic acid such as isophthalic acid or the like may be co-used in a small amount.

The glycol component constituting the aliphatic polyester unit is a glycol component having 2–12 carbon atoms, and specific examples thereof include the examples mentioned above as the glycol component constituting the aromatic polyester unit of the high melting crystalline segment (A-1).

The aliphatic polyester unit is prepared by polycondensing the above aliphatic dicarboxylic acid and the glycol component in a conventional manner, and may be homopolyester or copolyester, or polylactone (e.g., poly-ε-caprolactone) obtained by ring-opening polymerization of a cyclic lactone.

Although the upper limit of the melting point of the low melting polymer segment (A-2) is not critical, it is preferably 130° C., more preferably 100° C.

The molecular weight of the low melting polymer segment (A-2) is preferably in the range of 400– 6,000.

The weight ratio of the high melting crystalline segment (A-1) to the low melting polymer segment (A-2) in the thermoplastic polyester elastomer (A) is preferably 95/5–5/95, more preferably 70/30–30/70.

The thermoplastic polyester elastomer (A) is particularly preferably one having a softening point of not less than 100° C.

The polyester block copolymer which is particularly preferably used as the thermoplastic polyester elastomer (A) is one prepared from a polytetramethylene terephthalate or polytrimethylene terephthalate-2,6-naphthalate as the high melting crystalline segment (A1) and a polyether such as polytetramethylene glycol or the like and a polyester such as polytetramethylene adipate, poly-ε-caprolactone or the like as the low melting polymer segment (A-2).

As a part of the dicarboxylic acid and glycol, polycarboxylic acid, polyfunctional hydroxy compounds, hydroxy acids or the like may be copolymerized.

These polyfunctional components can act effectively as a viscosity-heightening component when they are copolymerized in a proportion of 3 mole % or less.

Said polyfunctional components include, for example, trimellitic acid, trimesic acid, pyromellitic acid, benzophenonetetracarboxylic acid, butanetetracarboxylic acid, glycerine, pentaerythritol, esters thereof and acid anhydrides thereof.

The thermoplastic polyester elastomer (A) can be prepared by a conventional polymerization method.

The thermoplastic polyester elastomer (A) is preferably prepared by a method comprising heating an aromatic dicarboxylic acid or a dimethyl ester thereof and a low melting segment-forming diol in the presence of a catalyst to a temperature of about 150°–260° C. to esterify or ester-exchange them and then subjecting the esterification or ester-exchange product to polycondensation while removing the excessive low molecular weight diol under reduced pressure to obtain a thermoplastic polyester elastomer; by a method comprising mixing a previously prepared high melting polyester segment-formable prepolymer and a previously prepared low melting polymer segment-formable prepolymer with a bifunctional chain extender which reacts with the terminal groups of the prepolymers, allowing them to react, keeping the system at a high vacuum to remove the volatile components, thereby obtaining a thermoplastic polyester elastomer; or by a method comprising heat-mixing a high melting polyester having a high degree of polymerization and a lactone to ester-exchange them while ring-opening polymerizing them, thereby obtaining a thermoplastic polyester elastomer.

The rubber which is the component (B) of this invention includes halogen-free diene rubbers, hydrogenated halogen-free diene rubbers, acrylic rubbers, epichlorohydrin rubbers, olefin rubbers, halogen-containing rubbers, silicone rubbers and the like.

The halogen-free diene rubber includes, for example, natural rubber, polyisoprene rubber, styrenebutadiene copolymer rubber, styrene-butadiene block copolymer rubber, polybutadiene rubber, acrylonitrilebutadiene copolymer rubber, acrylic acid ester-butadiene copolymer rubber and the like.

The hydrogenated halogen-free diene rubbers include, for example, hydrogenated polybutadiene, hydrogenated polyisoprene, hydrogenated styrenebutadiene random copolymer rubber, hydrogenated styrenebutadiene block copolymer rubber, hydrogenated acrylic acid ester-butadiene copolymer rubber, hydrogenated acrylonitrile-butadiene copolymer rubber and the like.

The above hydrogenated styrene-butadiene block copolymer includes, for example:

(b-1) a hydrogenated diene copolymer (referred to hereinafter as "hydrogenated polymer b-1") having a polystyrene-reduced number average molecular weight of 50,000–600,000, obtained by hydrogenating a (P)-(Q) or (P)-(Q)-(P) block copolymer in which (P) is an alkenyl aromatic compound polymer block and (Q) is a random copolymer block consisting of an alkenyl aromatic compound and a conjugated diene, or a (P)-(Q)-(R) block copolymer in which (P) and (Q) are as defined above and (R) is a tapered block consisting of an alkenyl aromatic compound and a conjugated diene in which tapered block the proportion of the alkenyl aromatic compound increases gradually (the above two block copolymers are referred to hereinafter as "polymer b-1"), in which hydrogenated polymer b-1 at least 80% of the double bonds of the conjugated diene portions is saturated with hydrogen;

(b-2) a hydrogenated diene copolymer (referred to hereinafter as "hydrogenated polymer b-2") having a polystyrene-reduced number average molecular weight of 40,000–700,000, obtained by hydrogenating a (P)-(S)-(T) block copolymer (referred to hereinafter as "polymer b-2") in which (P) is as defined above, (S) is a block consisting of a conjugated diene polymer or a copolymer of an alkenyl aromatic compound and a conjugated diene and having a 1,2-vinyl configuration content of 25–95%, and (T) is a conjugated diene polymer block having a 1,2-vinyl configuration content of 20% or less, in which hydrogenated polymer b-2 at least 80% of the double bonds of the conjugated diene portions are saturated with hydrogen;

(b-3) a hydrogenated diene copolymer (referred to hereinafter as "hydrogenated polymer b-3") having a polystyrene-reduced number average molecular weight of 50,00–600,000, obtained by hydrogenating a (T)-(S)-(T) or [(T)-(S)]$_m$ block copolymer (referred to hereinafter as "polymer b-3") in which (T) and (S) are as defined above and m is 2 or more, in which hydrogenated polymer b-3 at least 90% of the double bonds of the conjugated diene portions are saturated with hydrogen;

and the like.

The above alkenyl aromatic compound includes styrene, α-methylstyrene, t-butylstyrene, p-methylstyrene, divinylbenzene, 1,1-diphenylstyrene, N,N-diethyl-p-aminoesterstyrene, vinylpyridine and the like, and particularly preferable are styrene and α-styrene.

The above conjugated diene includes 1,3-butadiene, isoprene, 2,3-dimethyl-1,3-butadiene, 1,3-pentadiene, 1,3-hexadiene, 4,5-diethyl-1,3-octadiene, 3-butyl-1,3-octadiene, chloroprene and the like, and preferable are 1,3-butadiene, isoprene and 1,3-pentadiene. 1,3-Butadiene is particularly preferable.

In the polymer b-1, the alkenyl aromatic compound/conjugated diene weight ratio is preferably 5/95–60/40, more preferably 5/95–40/60.

The total of the bound alkenyl aromatic compound content in the block (P) and the block (R) is preferably 3–50% by weight, more preferably 3–25% by weight, based on the weight of the total monomers, and the 1,2-vinyl configuration content in the conjugated diene portions of the block (Q) is preferably at least 15%, more preferably at least 30%.

The hydrogenation degree of the hydrogenated polymer b-1 is at least 80%, preferably at least 90%.

The polystyrene-reduced number average molecular weight of the hydrogenated polymer b-1 is 50,000–600,000, preferably 70,000–250,000.

In the polymer b-2, the block (P) content is preferably 10–50% by weight, more preferably 15–45% by weight; the block (S) content is preferably 30–80% by weight, more preferably 35–70% by weight; and the block (T) content is preferably 5–30% by weight, more preferably 5–25% by weight.

In the block (S), the 1,2-vinyl configuration content is preferably 25–95%, more preferably 30–60%, and in the block (T), the 1,2-vinyl configuration content is preferably 20% or less, more preferably 5–15%.

The hydrogenation degree of the hydrogenated polymer b-2 is 80% or more, preferably 90% or more. The polystyrene-reduced number average molecular weight of the hydrogenated polymer b-2 is 40,000–700,000, preferably 60,000–400,000.

In the polymer b-3, the block (S) content is preferably 10–95% by weight, more preferably 15–90% by weight and the block (T) content is preferably 5–90% by weight, more preferably 10–85% by weight.

In the block (S) and the block (T), the 1,2-vinyl configuration content is the same as in the polymer b-2.

The hydrogenation degree of the hydrogenated polymer b-3 is 90% or more, preferably 95% or more, and the polystyrene-reduced number average molecular weight of the hydrogenated polymer b-3 is 50,000–60,000, preferably 100,000–400,000.

Each of the polymers b-1 to b-3 may be coupled with a coupling agent, and the coupled polymers include, for example, polymers represented by $[(P)\text{-}(Q)]_n\text{-}X$, $[(P)\text{-}(Q)\text{-}(R)]_n\text{-}X$, $[(P)\text{-}(Q)\text{-}(P)]_n\text{-}X$ $[(P)\text{-}(S)\text{-}(T)]_n\text{-}X$, $[(S)\text{-}(T)]_n\text{-}X$ and $[(T)\text{-}(S)\text{-}(T)]_n\text{-}X$ in which n is 2–4 and X is a coupling agent residue.

In this invention, the rubber (B) is preferably a halogen-free diene rubber, a hydrogenated halogen-free diene rubber, acrylic rubber, epichlorohydrin rubber or the like.

More specifically, the rubber (B) includes acrylonitrile-butadiene copolymer rubber, ethyleneacrylic acid ester copolymer rubber, hydrogenated acrylonitrile-butadiene copolymer rubber, hydrogenated acrylic acid ester-butadiene copolymer rubber, ethylenepropylene copolymer rubber and the like.

The above-mentioned hydrogenated acrylic acid ester-butadiene copolymer rubber is a hydrogenated product of a random copolymer rubber consisting of an alkyl acrylate or an alkoxy-substituted alkyl acrylate and a conjugated diene, in which at least 90% of the double bonds of polymerized conjugated diene units have been hydrogenated, and the hydrogenated product is described in detail in Japanese Patent Application Kokai No. 2-218,704.

In this invention, the compatibility of the rubber can be further enhanced by introducing a functional group such as a carboxyl group, an epoxy group, an amino group or the like into the rubber, whereby the mechanical strength and compression set can also be improved.

The introduction of a functional group can be effected by copolymerizing acrylic acid, methacrylic acid, itaconic acid, maleic acid, glycidyl (meth)acrylate, an alkyl amino(meth)acrylate or the like together with other components for forming the rubber (B).

The introduction of a functional group may be effected before mixing the rubber (B) with the component (A) or simultaneously with mixing the rubber (B) with the component (A).

In this invention, the solubility parameter value of the rubber (B) is preferably 8.0 or more, more preferably 8.5 or more and most preferably 9.0 or more.

For the solubility parameter of rubber, there can be utilized the values described in literature references such as "Rubber Industry Handbook" and "Guide to Rubber Techniques (Revised Edition)" both published by the Society of Rubber Industry, Japan. For rubbers not known in any literature, their solubility parameters can be measured by the various methods described in "Solvent Handbook" published by Kodansha Limited, Publisher.

Herein, as to the solubility parameters of rubbers not known in any literature, values obtained by the simple method proposed by Small in which a solubility parameter of a substance is calculated from the molecular cohesion energy constant of the substance are used as approximate values.

In this invention, the above rubbers may be used alone or in combination of two or more.

In the composition of this invention, the proportions of the thermoplastic polyester elastomer (A) and the rubber (B) blended are 50–98% by weight and 50–2% by weight, respectively, preferably 55–85% by weight and 45–15% by weight, respectively.

When the proportion of the component (A) exceeds 98% by weight, the enhancement effect on the flexibility and compression set of the composition obtained is not sufficient.

When the proportion of the component (A) is less than 50% by weight, the processability and fluidity of the composition obtained are inferior.

It is preferable that the rubber (B) of this invention is dispersed in and mixed with the thermo-plastic polyester elastomer (A), and the average particle size of the dispersed rubber (B) is preferably 50 μm or less, more preferably 10 μm or less, and most preferably 5–0.01 μm. When the particle size of the dispersed rubber (B) is too large, good physical properties are not obtained.

In this invention, the particle sizes of at least 100 particles were measured in a random visual field observed by an electron microscope, and the average of the values obtained is used as the average particle size.

Moreover, when the particles are not spherical, the diameters of circle areas corresponding to the cross-sectional areas of the particles observed are used as the particle sizes.

The component (C) of this invention is a polyorganosiloxane represented by the composition formula $R_aSiO_{(4-a)/2}$ in which R is a substituted or unsubstituted monovalent organic group and a is a numeral of 1,900–2.004.

The polyorganosiloxane (C) is mainly a straight chain compound having the above composition formula, and a part thereof may form a branched chain or a three-dimensional structure. Further, it may be a homopolymer, a copolymer or a mixture of them.

In the above average composition formula, specific examples of R include methyl group, ethyl group, propyl group, vinyl group, phenyl group, hydrogen atom, amino group, epoxy group and halogen-substituted hydrocarbon groups.

In the above composition formula, a is 1.900–2.004, preferably 1.950–2.002. When it is less than 1.900, the heat resistance is not satisfactory, and when it exceeds 2.004, it is impossible to obtain a polyorganosiloxane having the necessary polymerization degree.

The molecular chain terminals of the polyorganosiloxane (C) may be blocked with, for example, hydroxyl groups, alkoxy groups, trimethylsilyl groups, dimethylvinylsilyl groups, methylphenylvinylsilyl groups, methyldiphenylsilyl groups or the like.

The viscosity of the polyorganosiloxane (C) as measured at 25° C. is preferably 10–1,000,000 cs, more preferably 20–8,00,000 cs. When the viscosity is less than 10 cs, the abrasion resistance is not satisfactory and when it exceeds 1,000,000 cs, the synthesis of the polyorganosiloxane is difficult and the formability is inferior.

Specific examples of the polyorganosiloxane (C) include diemthylpolysiloxane, methylpolysiloxane, methylphenylpolysiloxane, methylhydrogenpolysiloxane and the like. Dimethylpolysiloxane is particularly preferable in an aspect of cost.

In practical use, in view of workability and dispersibility, the polyorganosiloxane (C) is more preferably a master batch in which the polyorgano-siloxane is previously blended with a resin or rubber, or a blend with a filler such as a silicone rubber powder, silica or the like.

The amount of the polyorganosiloxane (C) added is 0.01–10 parts by weight, preferably 0.05–5 parts by weight, per 100 parts by weight of the total of the thermoplastic polyester elastomer (A) and the rubber (B).

The polyorganosiloxane (C) may be melt-compounded by use of a single or twin screw extruder, a roll, a Banbury mixer, a kneader or the like; may be mixed with the polymer by use of a Henschel mixer, ribbon blender, tumbler or the like; or may be added during the polymerization or at the end of the polymerization.

In this invention, the thermoplastic polyester elastomer (A), the rubber (B) and the polyorganosiloxane (C) may be simply blended or, in order to obtain a composition having better performance, they may be subjected to dynamic cross-linking during the mixing.

The dynamic cross-linking is a process developed by W. M. Fischer of Uniroyal and by A. Y. Coran of Monsanto, according to which a rubber is blended into a matrix of the thermoplastic resin, they are kneaded together with a cross-linking agent at a temperature higher than the temperature at which the cross-linking agent cross-links the rubber whereby the rubber is highly cross-linked and simultaneously finely dispersed.

In this invention, when the dynamic cross-linking is effected, the gel content in the rubber (B) is preferably 50% by weight or more, more preferably 70% by weight or more.

Incidentally, the gel content is a proportion of the insolubles obtained when the cross-linked rubber is dissolved in a solvent capable of sufficiently dissolving the uncross-linked rubber, for example, toluene, methyl ethyl ketone or the like.

The cross-linking agent used in the dynamic cross-linking may be a cross-linking agent which can be used for usual rubbers such as a peroxide, a resin-cross-linking agent, sulfur or the like.

Specific examples of the cross-linking agent include cross-linking agents, cross-linking coagents, cross-linking accelerators and the like which are described in "Kakyozai Handobukku (Cross-Linking Agent Handbook)" by Shinzo Yamashita and Tosuke Kaneko published by Taiseisha. In other words, in this invention, sulfur type cross-linking agents and aliphatic type cross-linking agents may be preferably used.

When a sulfur type cross-linking agent or an aliphatic type cross-linking agent is used as the crosslinking agent, 0.1–8 parts by weight of a main crosslinking agent, 0.1–10 parts by weight of a vulcanization accelerator, 0.5–10 parts by weight of an accelerator activator and 0.5–10 parts by weight of an activator and 0.1–10 parts by weight of a cross-linking coagent are used per 100 parts by weight of the rubber (B) in the composition of this invention.

When an organic peroxide is used as the cross-linking agent, it is added in such an amount that the amount of active oxygen in the organic peroxide becomes 0.0001–0.3 mole per 100 parts by weight of the rubber (B) in the thermoplastic elastomer composition of this invention. When the amount is less than 0.0001 mole, no sufficient cross-linking is caused. On the other hand, the addition of the organic peroxide in such an amount that the amount of active oxygen is more than 0.3 mole is not expected to cause any further cross-linking, is not economical and tends to cause undesirable side reactions such as decomposition of polymer or the like.

The simple blending or dynamic cross-linking in this invention may be conducted by kneading the above-mentioned components by means of an extruder, a Bunbury mixer, a kneader or a combination thereof.

Particularly, in the case of dynamic cross-linking, it is most preferable in view of productivity to continuously produce the composition by means of a twin screw extruder. In this case, a plasticizer and a cross-linking agent are added in the middle of the extruder. The twin screw extruder used is preferably of a long shaft type having a L/D of 30 or more.

The addition of all the components during the dissolution and kneading may be conducted by either a method comprising adding the components (A), (B) and (C) and the cross-linking agent simultaneously, or a method comprising kneading the components (A), (B) and (C) and adding the cross-linking agent on the way of the kneading; however, the latter is preferred.

In this invention, the rubber (B) is sufficiently dispersed in the thermoplastic polyester elastomer (A), during which a so-called compatibilizing agent may be added in order to strengthen the interface to enhance the physical properties. The compatibilizing agent is roughly classified into that causing no chemical reaction and that causing chemical reaction. The former is usually a block copolymer or graft copolymer, and exhibits a so-called emulsifying action, and the latter is a polymer having a functional group at the terminals and in the side chain; a high molecular weight macromer having a polymerizable group at the terminals of polymer chain; or the like.

Specific examples of the compatibilizing agent include ethylene/glycidyl methacrylate copolymer-polymethyl methacrylate graft polymer, ethylene/glycidyl methacrylate copolymer-acrylonitrile/styrene copolymer graft polymer, ethylene/glycidyl methacrylate copolymer-polystyrene graft polymer, ethylene/ethyl acrylate copolymer-polymethyl methacrylate graft polymer, ethylene/ethyl acrylate copolymer-polyacrylonitrile graft polymer, ethylene/vinyl acetate copolymer-polyacrylonitrile graft polymer, ethylene/vinyl acetate copolymer-polystyrene graft polymer, polypropylene-polyacrylonitrile graft polymer, polypropylene-polystyrene graft polymer, polyethylene-polymethyl methacrylate graft polymer, polyethylene-polyacrylonitrile graft polymer, polyethylene-polystyrene graft polymer, epoxy-modified polystyrene-polymethyl methacrylate graft polymer, polybutylene terephthalate-polystyrene graft polymer, acid-modified acrylate-polystyrene graft polymer, polystyrene-polymethyl methacrylate graft polymer, polystyrene-polyethylene graft polymer, polystyrene-polybutadiene graft polymer, polystyrene-polyacrylo-nitrile block copolymer, polystyrene-polybutyl acrylate block copolymer, oxazoline group-containing polystyrene, oxazoline group-containing acrylonitrile-styrene copolymer and the like.

Specific examples of the compatibilizing agent include commercially available products such as MODIPER A1100, A3100, A4100, A5100, A6100, A1200, A4200, A5200, A6200, A1400, A3400, A4400, A5400 and A6400 (products of NOF CORP.); RESEDA (registered trademark of TOA-GOSEI CHEMICAL INDUSTRY CO., LTD.) GP100, GP200, GP300, GP400, GP500 and GP700; etc.

Examples of compatibilizing agent including these commercially available products are mentioned in Saburo Akiyama, "Hyomen (Surface)", Vol 29, No. 1 (1991) and Yoshiharu Maeda, et al., "Kobunshi Kakao (High Polymer Processing)", Vol. 40, No. 4 (1991) and the like.

Among the above-mentioned compatibilizing agents, preferable examples are those having an epoxy group, an oxazoline group or a carboxyl group which reacts directly with the thermoplastic polyester elastomer (A) though they are varied depending upon the kind of the rubber (B) used.

The amount of the compatibilizing agent added is preferably 0.5–20 parts by weight, more preferably 1–10 parts by weight, per 100 parts by weight of the total of the components (A), (B) and (C).

The thermoplastic elastomer composition of this invention may further contain a plasticizer in such an amount as not to impair the mechanical strength and the like in order to further enhance the flexibility and fluidity.

Plasticizers which may be used in this invention include process oil; mineral oil type softening agents for rubber which are called extender oil; phthalic acid esters such as dioctyl phthalate, dibutyl phthalate, diethyl phthalate, butylbenzyl phthalate, di-2-ethylhexyl phthalate and the like; phosphoric acid esters such as tricresyl phosphate, triethyl phosphate, tributyl phosphate, tri-2-ethylhexyl phosphate, trimethyl phosphate, tributoxyethyl phosphate, tris(chloroethyl) phosphate, tris(dichloropropyl)phosphate, condensed phosphoric acid ester, triphenyl phosphate, trixylenyl phosphate, cresyldiphenyl phosphate, xylenyldiphenyl phosphate, tricetyl phosphate, tristearyl phosphate, trioleyl phosphate and the like; trimellitic acid esters such as octyl trimellitate, isononyl trimellitate, isodecyl trimellitate and the like; fatty acid esters such as dioctyl adipate, dimethyl adipate, di-2-ethylhexyl adipate, diisobutyl adipate, dibutyl adipate, diisodecyl adipate, dibutyldiglycol adipate, di-2-ethylhexyl azelate, dioctyl azelate, dioctyl sebacate, di-2-ethylhexyl sebacate, methylacetyl ricinoleate and the like; pyrromellitic acid esters such as octyl pyrromellitate and the like; epoxy plasticizers such as epoxidized soybean oil, epoxidized linseed oil, alkyl esters of epoxidized fatty acids (for example, octyl esters of epoxidized fatty acids) and the like; polyether plasticizers such as adipic acid etheresters, polyether esters, polyethers and the like; etc. These plasticizers may be used alone or in combination of two or more.

When the above plasticizer is added to the thermoplastic elastomer composition of this invention, phthalic acid esters, phosphoric acid esters, epoxy plasticizers and polyether plasticizers are preferably used in view of bleeding, and phthalic acid esters and polyether plasticizers are more preferably used.

The addition of the plasticizer may be either before or after the addition of the cross-linking agent, and a part thereof may be added before the addition of the cross-linking agent and then the remainder may be added after the addition of the cross-linking agent.

The amount of the plasticizer added is preferably 1–40 parts by weight, more preferably 2–20 parts by weight, per 100 parts by weight of the total of the components (A), (B) and (C).

The fluidity and flexibility of the composition of this invention can be further improved by compounding with the composition a liquid rubber such as a liquid acrylonitrile-butadiene copolymer rubber, a liquid acrylic rubber, a liquid polybutadiene rubber or the like in such an amount that the mechanical properties are not impaired.

The thermoplastic elastomer composition of this invention may contain a filler such as calcium carbonate, calcium silicate, clay, kaoline, talc, silica, diato-maceous earth, mica powder, asbestos, alumina, barium sulfate, aluminum sulfate, calcium sulfate, basic magnesium carbonate, molybdenum disulfide, graphite, carbon black, carbon fiber or the like; or a coloring agent such as carbon black, ultramarine, titanium oxide, zinc white, red iron oxide, Prussian blue, azo pigment, nitro pigment, color lake, phthalocyanine pigment or the like, in such an amount that the fluidity and mechanical properties are not impaired.

The thermoplastic elastomer composition of this invention may contain various additives such as an antioxidant, a light stabilizer, an ultraviolet absorber and the like in combination of two or more.

Specific examples of the antioxidant include amine type antioxidants such as phenyl-α-naphthylamine (PAN), octyldiphenylamine, N,N'-diphenyl-p-phenylenediamine (DPPD), N,N'-di-β-naphthyl-p-phenylenediamine (DNPD), N-(1,3-dimethylbutyl)-N'-phenyl-p-phenylenediamine, N-phenyl-N'-isopropyl-p-phenylenediamine (IPPD), N,N'-diallyl-p-phenylenediamine, phenothiazine derivatives, diallyl-p-phenylenediamine mixtures, alkylated phenylenediamine, 4,4'-(α,α-dimethylbenzyl)-diphenylamine, p,p-toluenesulfonylaminodiphenylamine, N-phenyl-N'-(3-methacryloyloxy-2-hydropropyl)-p-phenylenediamine, diallylphenylenediamine mixtures, diallyl-p-phenylenediamine mixtures, N-(1-methylheptyl)-N'-phenyl-p-phenylenediamine, diphenylamine derivatives and the like; imidazole type antioxidants such as 2-mercaptobenzoimidazole (MBI), zinc salt of 2-mercaptobenzothiazole (ZnMBI), zinc salt of 2-mercaptomethylbenzoimidazole, tributylthiourea, 1,3-bis(dimethylamino-propyl)- 2-thiourea and the like; phenol type antioxidants such as 2,5-di-t-amylhydroquinone (DAHQ), 2,5-di-t-butylhydroquinone (DBHQ), 4,4'-hydroxydiphenyl-cyclohexane, 2,2'-methylene-bis(4-methyl-6-t-butylphenol) (MBMTB), 2,6-di-t-butyl-4-methylphenol, 4,4'-thio-bis(6-t-butyl-3-methylphenol), styrenated phenol, 2,2'-methylene-bis(4-ethyl-6-t-butylphenol), 2,6-di-t-butyl-4-ethylphenol, bis(3,5-di-t-butyl-4hydroxybenzyl) sulfide, phenol derivatives, bisphenol derivatives and the like; dithiocarbamic acid salt type antioxidants such as reaction product of acetone and diphenylamine (ADPAL), reaction product of diphenylamine, aniline and acetone, polymer of 2,2,4-trimethyl-1,2-dihydroquinoline (TMDQ), 6-ethoxy-2, 2,4-trimethyl-1,2-dihydroquinoline (ETMDQ), reaction products of amines and ketones, dilauryl thio-propionate, nickel dibutyldithiocarbamate (NiDBC), nickel diethyldithiocarbamate and the like; antioxidants such as tri(nonylphenyl) phosphate and the like; and secondary antioxidants such as tri(nonylphenyl) phosphite, triphenyl phosphite, diphenyl isodecyl phosphite, trioctadecyl phosphite, tridecyl phosphite, thiodipropionic acid, dilauryl thiodipropionate, distearyl thiodipropionate, dimyristyl thiodipropionate, distearyl ββ-thiodibutyrate and the like.

Specific examples of the light stabilizer and ultraviolet absorber include 4-t-butylphenyl salicylate, 2,4-dihydroxybenzophenone, 2,2'-dihydro-4-methoxybenzophenone, ethyl-2-cyano-3,3'-diphenyl acrylate, 2-ethyl-hexyl- 2-cyano-3,3'-diphenyl acrylate, 2-(2'-hydroxy-3'-t-butyl- 5'-methylphenyl)-5-chlorobenzotriazole, 2-(2' -hydroxy-3,5'-di-t-butylphenyl)benzotriazole, 2-(2'-hydroxy-5'-methylphenyl)benzotriazole, 2-hydroxy-5-chlorobenzophenone, 2-hydroxy-4-methoxybenzophenone, 2-hydroxy-4-octoxybenzophenone, 2-(2'-hydroxy-4-octoxyphenyl)benzotriazole, monoglycol salicylate, oxalic acid amide, phenyl salicylate, 2,2',4,4'-tetrahydroxybenzophenone and the like.

With the thermoplastic elastomer composition of this invention may be suitably blended a resin such as polypropylene, polyvinyl chloride, polycarbonate, PET, PBT, polyacetal, polyamide, epoxy resin, polyvinylidene fluoride, polysulfone, ethylene-vinyl acetate copolymer, PPS resin, polyetheretherketone, PPO resin, styrene-methyl methacrylate copolymer, styrene-maleic anhydride copolymer, rubber-modified PPO resin, styrene-maleimide copolymer, rubber-modified styrene-maleimide copolymer or the like.

The hardness of the thermoplastic elastomer composition of this invention is preferably 60–95 point (JIS A hardness), more preferably 70–95 point and most preferably 80–95 point.

When the thermoplastic elastomer composition of this invention is used in, for example, joint boot, if the hardness is too low, the resistance to rotational expansion becomes insufficient, whereby the bellow portion of the boot is expanded by a centrifugal force during the high-speed rotation, and further the resistance to negative pressure becomes insufficient, whereby the bellow portion of the boot is caved in when the boot inside pressure is reduced owing to the lowering of temperature. When the hardness of the composition is higher than required, the object of this invention cannot be achieved.

The thermoplastic elastomer composition of this invention can be molded by a molding method such as a blow molding, an injection-blow molding or the like.

The thermoplastic elastomer composition of this invention can also be injection molded and when it is formed into, for example, a constant velocity joint boot, the thickness of the boot can be made uniform by injection molding.

For producing a boot by injection molding, the MFR (fluidity as measured at 230° C. under a load of 10 kg) of the composition is preferably not less than 0.1 g/10 minutes, more preferably 5-100 g/10 minutes and most preferably 10-100 g/10 minutes.

The constant velocity joint boot produced using the thermoplastic elastomer composition of this invention is excellent in not only basic characteristics such as strength, compression set, heat resistance, weather resistance, cold resistance, grease resistance and the like but also practical properties such as fatigue resistance, abrasion resistance and the like. In addition, said joint boot is very flexible.

The thermoplastic elastomer composition of this invention is a new material for joint boot (particularly for constant velocity joint boot), which material has no drawbacks as possessed by conventional materials such as chloroprene rubber and mere thermoplastic polyester elastomer.

The thermoplastic elastomer composition of this invention can be used as elemental materials for automobile parts (e.g. bumper part, side shield, steering wheel, joint boot, molding, handle, Rack & Pinion type steering boots, Macpherson strut boots, boots for propeller shaft, towlink boots, steering boots, ball joint seal, tie rod seal, universal join seal, bellows for air suspension, rolling diaphragm); footwear (e.g. shoe sole, sandal); electrical parts (e.g. cap, plug); sports and leisure goods (e.g. golf club grip, baseball bat grip, swimming fin, water glass); rubber contacts (e.g. keyboard switch); curl cords; couplings; O-rings; gaskets; waterproof cloth; tubes and hoses (e.g. hydraulic hose); packing roll; belts; etc.

DESCRIPTION OF PREFERRED EMBODIMENTS

This invention is described in more detail below referring to Examples. However, this invention is by no means restricted to these Examples.

EXAMPLE 1

Using a twin screw extruder, a thermoplastic polyester elastomer (PIBIFLEX, a polyester elastomer manufactured by Enichem Polymeri Co., Ltd.), an acrylonitrile-butadiene rubber (referred to hereinafter as NBR) [bound acrylonitrile content=41% by weight, Mooney viscosity ($L_{1+4}$ 100° C.)= 56, SP value=10.0]and polyorganosiloxane (silicone oil) were blended in the proportions shown in Table 1 at 210° C. at a 200 rpm, and in the middle of the twin screw extruder, 0.4 part by weight of Kayahexa AD (a product of KAYAKU AKZO CORPORATION; a cross-linking agent) and 0.6 part by weight of cross-linking coagent 1 (VULNOC PM; a product of Ohuchi Shinko Chemical Industrial Co., Ltd.) were added, per 100 parts by weight of the total of the thermoplastic polyester elastomer and the acrylonitrilebutadiene rubber to subject the components to dynamic cross-linking. Thereafter, 1% by weight of NOCRAC NBC (a product of Ohuchi Shinko Chemical Industrial Co., Ltd.) and 0.2% by weight of IRGANOX 1010 [a product of Ciba-Geigy (Japan) Limited] were added as antioxidants to obtain a composition having the properties shown in Table 1.

EXAMPLE 2

The same procedure as in Example 1 was repeated, except that the cross-linking coagent and the cross-linking agent were not used to obtain a composition having the properties shown in Table 1.

EXAMPLES 3-8

Compositions were obtained in the same manner as in Example 1 according to the compounding recipes shown in Table 1.

The properties of the compositions are shown in Table 1.

EXAMPLE 9

In a reactor were placed 4,000 g of dimethyl terephthalate, 4,000 g of tetramethylene glycol, 930 g of dimeric acid and 6 g of tetrabutyl titanate, and these were subjected to ester-exchange reaction.

When the reaction proceeded 95% or more, 6 g of 1,3,5-tris(4-hydroxy-3,5-di-t-butylbenzyl)-2,4,6 -trimethylbenzene and 530 g of polytetramethylene glycol having a weight average molecular weight of 1,000 were added to the reaction mixture and they were mixed, after which the resulting mixture was transferred to an autoclave and subjected to polycondensation reaction therein at 250° C. at a reduced pressure of 0.2 mmHg for 110 minutes to obtain a polymer.

Thereafter, 1 part by weight of dimethylpolysiloxane (a product of Toray-Dow Corning Silicone K. K.) SH200 (viscosity: 10,000 cs) was added to 100 parts by weight of the polymer. The reduced viscosity thereof was 1.20 and the melting point thereof was 205° C.

The same procedure as in Example 1 was repeated, except that the polymer thus obtained was substituted for the thermoplastic elastomer (PIBIFLEX) and no silicone oil was added to obtain a composition having the properties shown in Table 1.

EXAMPLES 10-12

Compositions were obtained in the same manner as in Example 1 according to the compounding recipes shown in Table 1.

The properties of the compositions are shown in Table 1.

COMPARATIVE EXAMPLE 1

A composition was produced in the same manner as in Example 1, except that a fluorine resin was substituted for the polyorganosiloxane according to the compounding recipe shown in Table 2.

The properties of the composition are shown in Table 2.

COMPARATIVE EXAMPLE 2

A composition was produced in the same manner as in Example 1, except that the silicone oil was not used, according to the compounding recipe shown in Table 2.

The properties of the composition are shown in Table 2.

COMPARATIVE EXAMPLE 3

A composition was produced in the same manner as in Example 1, except that molybdenum disulfide was substituted for the polyorganosiloxane, according to the compounding recipe shown in Table 2.

The properties of the composition are shown in Table 2.

COMPARATIVE EXAMPLE 4

A composition was produced in the same manner as in Example 2, except that the silicone oil was not used, according to the compounding recipe shown in Table 2.

The properties of the composition are shown in Table 2.

COMPARATIVE EXAMPLE 5

A composition was produced in the same manner as in Comparative Example 2, except that the amount of the thermoplastic polyester elastomer was changed to 100 parts by weight and the NBR was not used, according to the compounding recipe shown in Table 2.

The properties of the composition are shown in Table 2.

COMPARATIVE EXAMPLE 6

A composition was produced in the same manner as in Comparative Example 2, except that the weight ratio of the thermoplastic polyester elastomer to the rubber was changed to 45:55, according to the compounding recipe shown in Table 2.

The properties of the composition are shown in Table 2.

COMPARATIVE EXAMPLE 7

A composition was produced in the same manner as in Example 1, except that the amount of silicone oil added was changed to 15 parts by weight, according to the compounding recipe shown in Table 2.

The properties of the composition are shown in Table 2.

Incidentally, the properties of the compositions obtained were measured by the methods shown in Test Examples 1 and 2, provided that the particle size of the component (B) and MFR were measured as follows:

(1) Particle size of the component (B):

At least 100 rubber particles were measured in the random visual field observed by an electron microscope, and the average of the values obtained was determined.

(2) MFR:

Measured at 230° C. under a load of 10 kg. Test Example 1 (evaluation of properties in the sheet form)

Each of the compositions obtained in Examples 1–12 and Comparative Examples 1–7 was pelletized and formed into a sheet having a thickness of 2 mm by an injection machine at 210° C., and the sheet was evaluated for the following items, and the results obtained are shown in Tables 1 and 2:

(3) Hardness (Hs)

Measured by JIS K-6301 (JIS A hardness)

(4) Tensile strength (TB)

Measured by JIS K-6301 (JIS No. 3 dumbbell)

(5) Tensile strength ($E_B$)

Measured by JIS K-6301 (JIS No. 3 dumbbell)

(6) Compression set

Measured by JIS K-6301 (120° C., 22 hours)

(7) Thermal aging resistance

Measured by JIS K-6301 as follows:

A sample was aged at 120° C. for 70 hours using a Geer oven, and then subjected to measurement of tensile strength. The thermal aging was expressed by a change (%) of the tensile strength relative to that before thermal aging test.

(8) Oil resistance

Measured by JIS K-6301

Immersed in JIS No. 3 oil at 120° C. for 70 hours and then subjected to measurement of tensile strength. The oil resistance was expressed by a change (%) of the tensile strength relative to that before the oil resistance test.

(9) Appearance of molded article

Expressed as "good" when no short shot occurred and the appearance of the molded article was not remarkably bad in respect of flow mark and delamination.

Test Example 2 (evaluation of abrasion resistance by Suzuki's system abrasion test)

Each of the compositions obtained in Examples 1–12 and Comparative Examples 1–7 was injection molded through a ring die to prepare a test piece of the cylinder form having a ring shape cross-section (inner diameter: 20 mm, outer diameter: 25.6 mm, height: 15 mm).

Two same cylindrical test pieces (e.g. two test pieces formed from the composition of Example 1) were concentrically placed one upon another with an abrasion tester (Model EFM-III-E) manufactured by Kabushiki Kaisha Orientech, and a load of 2 kg was applied thereto, under which the test pieces were slided each other at a sliding speed (peripheral speed) of 19.6 cm/sec at the perpendicular face in contact (annular cross sections of cylinders).

The weight of the test pieces was measured after 15 minutes and the wear was calculated from the difference thereof from that before the test.

The values obtained are shown in Tables 1 and 2, the "(10) Wear" row.

TABLE 1

| Composition (parts by weight) & properties | Examples No. | | | | |
|---|---|---|---|---|---|
| | 1 | 2 | 3 | 4 | 5 |
| TPEE*1 | 60 | 60 | 60 | 70 | 60 |
| TPEI*2 | | | | | |
| NBR*3 | 40 | 40 | | | 40 |
| EP*4 | | | 40 | 30 | |
| P.O*5 | 0.4 | | 0.4 | 0.4 | 0.4 |
| Silicone oil 100*6 | 1 | 1 | | | |
| Silicone oil 10000*7 | | | 2 | | |
| Silicone oil 100000*8 | | | | 2 | |
| Methylhydrogen*9 | | | | | 1 |
| Methylphenyl-polysiloxane*10 | | | | | |
| Powder*11 | | | | | |
| Resin MB*12 | | | | | |
| Adjuvant 1*13 | 0.6 | 0.6 | 0.6 | 0.6 | 0.6 |
| Antioxidant 1*14 | 1 | 1 | 1 | 1 | 1 |
| Antioxidant 2*15 | 0.2 | 0.2 | 0.2 | 0.2 | 0.2 |
| (1) Particle size of component (B) (μm) | 1.0 | 1.7 | 1.2 | 1.1 | 0.9 |
| (2) MFR (g/min) | 25 | 70 | 20 | 25 | 20 |
| (3) Hs (JIS A) | 87 | 85 | 79 | 90 | 87 |
| (4) $T_B$ (kg/cm²) | 150 | 90 | 120 | 120 | 145 |
| (5) $E^B$ (%) | 900 | 500 | 650 | 800 | 900 |
| (6) Compression set (%) | 50 | 70 | 55 | 68 | 48 |
| (7) Heat resistance test (%) | −13 | −10 | −6 | −3 | −10 |
| (8) Oil resistance test (%) | −4 | −3 | −20 | −6 | −3 |
| (9) Appearance of molded article | good | good | good | good | good |

TABLE 1-continued

| (10 Wear (mg)) | | | 20 | 40 | 10 | 7 | 40 |
|---|---|---|---|---|---|---|---|

| Composition (parts by weight) & properties | Example No. | | | | | | |
|---|---|---|---|---|---|---|---|
| | 6 | 7 | 8 | 9 | 10 | 11 | 12 |
| TPEE*¹ | 60 | 60 | 60 | | 90 | 60 | 60 |
| TPE1*² | | | | 60 | | | |
| NBR*³ | 40 | 40 | 40 | 40 | 10 | 40 | 40 |
| EP*⁴ | | | | | | | |
| P.O*⁵ | 0.4 | 0.4 | 0.4 | 0.4 | 0.4 | 0.4 | 0.4 |
| Silicone oil 100*⁶ | | | | 1 | 1 | 0.08 | 5 |
| Silicone oil 10000*⁷ | | | | | | | |
| Silicone oil 100000*⁸ | | | | | | | |
| Methylhydrogen*⁹ | | | | | | | |
| Methylphenyl polysiloxane*¹⁰ | 1 | | | | | | |
| Powder*¹¹ | | 4 | | | | | |
| Resin MB*¹² | | | 4 | | | | |
| Cross-linking coagent 1*¹³ | 0.6 | 0.6 | 0.6 | 0.6 | | | |
| Antioxidant 1*¹⁴ | 1 | 1 | 1 | 1 | 1 | 1 | 1 |
| Antioxidant 2*¹⁵ | 0.2 | 0.2 | 0.2 | 0.2 | 0.2 | 0.2 | 0.2 |
| (1) (μm) | 1.0 | 1.0 | 0.9 | 0.8 | 0.9 | 0.9 | 1.0 |
| (2) (g/min) | 20 | 26 | 27 | 28 | 100 | 22 | 35 |
| (3) (JIS A) | 88 | 87 | 88 | 88 | 90 | 86 | 87 |
| (4) (kg/cm²) | 155 | 150 | 140 | 155 | 160 | 145 | 140 |
| (5) (%) | 950 | 900 | 850 | 900 | 900 | 900 | 900 |
| (6) (%) | 55 | 55 | 60 | 55 | 70 | 55 | 60 |
| (7) (%) | −7 | −6 | −10 | −7 | −13 | −7 | −10 |
| (8) (%) | −2 | −2 | −5 | −6 | −2 | −2 | −5 |
| (9) | good | good | good | good | good | good | good |
| (10) (mg) | 15 | 7 | 6 | 18 | 7 | 20 | 5 |

TABLE 2

| Composition (parts by weight) & properties | Comparative Example No. | | | |
|---|---|---|---|---|
| | 1 | 2 | 3 | 4 |
| TPEE*¹ | 60 | 60 | 60 | 60 |
| NBR*² | 40 | 40 | 40 | 40 |
| P.O*⁵ | 0.4 | 0.4 | 0.4 | |
| Fluorine resin*¹⁶ | 10 | | | |
| Mo disulfide*¹⁷ | | | 5 | |
| Silicone oil*⁷ | | | | |
| Adjuvant 1*¹³ | 0.4 | 0.4 | 0.3 | |
| Antioxidant 1*¹⁴ | 1 | 1 | 1 | 1 |
| Antioxidant 2*¹⁵ | 0.2 | 0.2 | 0.2 | 0.2 |
| (1) Particle size of component (B) (μm) | 1.0 | 1.1 | 1.0 | 1.8 |
| (2) MFR (g/min) | 12 | 9 | 14 | 60 |
| (3) Hs (JIS A) | 95 | 88 | 90 | 88 |
| (4) $T_B$ (kg/cm²) | 120 | 145 | 130 | 110 |
| (5) $E_B$ (%) | 850 | 850 | 800 | 650 |
| (6) Compression set (%) | 65 | 62 | 58 | 75 |
| (7) Heat resistance test (%) | −20 | −10 | −9 | −10 |
| (8) Oil resistance test (%) | −10 | −3 | −4 | −4 |
| (9) Appearance of molded article | good | good | good | good |
| (10) Wear (mg) | 140 | 100 | 170 | 150 |

| Composition (parts by weight) & properties | Comparative Example No. | | |
|---|---|---|---|
| | 5 | 6*¹⁸ | 7 |
| TPEE*¹ | 100 | 45 | 60 |
| NBR*³ | 0 | 55 | 40 |
| P.O*⁵ | 0.4 | 0.4 | 0.4 |
| Flurone resin*¹⁶ | | | |
| Mo disulfide*¹⁷ | | | |
| Silicone oil*⁷ | 2 | 1 | 15 |
| Adjuvant 1*¹³ | 0.3 | 0.3 | 0.3 |
| Antioxidant 1*¹⁴ | 1 | 1 | 1 |
| Antioxidant 2*¹⁵ | 0.2 | 0.2 | 0.2 |
| (1) Particle size of component (B) (μm) | —*¹⁹ | —*²⁰ | 1.5 |
| (2) MFR (g/min) | 85 | — | 100 |
| (3) Hs (JIS A) | 95 | — | 88 |
| (4) $T_B$ (kg/cm²) | 160 | — | 90 |
| (5) $E_B$ (%) | 1000 | — | 650 |
| (6) Compression set (%) | 99 | — | 75 |
| (7) Heat resistance test (%) | −10 | — | −8 |
| (8) Oil resistance test (%) | −4 | — | −3 |
| (9) Appearance of molded article | good | bad | bad |
| (10) Wear (mg) | 2 | — | 2 |

Notes to Tables 1 and 2:
*¹PIBIFLEX m (product of Enichem Polymeri), melting point: 191° C.
*²TPEE of Example 9
*³NBR of Example 1
*⁴JSR EP02P (product of Japan Synthetic Rubber Co., Ltd.)
*⁵Kayahexa AD (product of KAYAKU AKZO CORPORATION)
*⁶Dimethylpolysiloxane [SH200 (product of Toray-Dow Corning Silicone K. K.), viscosity: 100 cs]
*⁷Dimethylpolysiloxane [SH200 (product of Toray-Dow Corning Silicone K. K.), viscosity: 10,000 cs]
*⁸Dimethylpolysiloxane [SH200 (product of Toray-Dow Corning Silicone K. K.), viscosity: 100,00 cs]
*⁹Methylhydrogenpolysiloxane [SH1107 (product of Toray-Dow Corning Silicone K.K.], viscosity: 30 cs]
*¹⁰Methylphenylpolysiloxane [SH710 (product of Toray-Dow Corning Silicone K.K.], viscosity: 500 cs]
*¹¹Silicone rubber powder [Torefil F-202 (60% grade) (product of Toray-Dow Corning Silicone K. K.)]
*¹²Resin (thermoplastic polyester elastomer) master batch product [BY27-010 (50% grade) (product of Toray-Dow Corning Silicone K. K.)]
*¹³VULNOC PM (product of Ohuchi Shinko Chemical Industrial Co., Ltd.)
*¹⁴NOCRAC NBC (product of Ohuchi Shinko Chemical Industrial Co., Ltd.)
*¹⁵IRGANOX 1010 (product of Ciba-Geigy (Japan) Limited)
*¹⁶Fluorine resin [Fluon 169 (product of Asahi Glass Co., Ltd.)]
*¹⁷Molybdenum disulfide [Molypowder PS (product of Sumiko Junkatsuzai K. K.)]
*¹⁸Impossible to injection mold
*¹⁹Unmeasurable because of no rubber component
*²⁰Unmeasurable because of insufficient molding As is clear from the results shown in Tables 1 and 2, the compositions of Examples 1–2 have small wear, a large MFR which is an indication of formability, a good formability and no problem about other physical properties.

On the other hand, the compositions of Comparative Examples 1 and 3 contain a fluorine resin or molybdenum disulfide as an abrasion resisting agent, but have a large wear, a small MFR and inferior formability.

The composition of Comparative Example 2 contains no polyorgansiloxane and hence have a large wear and a small MFR.

The composition of Comparative Example 4 contains no polyorganosiloxane; however, the MFR is large and the wear is large.

Moreover, the composition of Comparative Example 5 contains the rubber in an amount smaller than the range of this invention and hence has a high hardness and a large compression set though the wear is small.

Furthermore, the composition of Comparative Example 6 contains the rubber in an amount larger than the range of this invention, and hence, strand could not be drawn in the production by an extruder and the production was difficult. The composition obtained did substantially not flow and could not be injection-molded.

The composition of Example 7 contains the polyorgansiloxane in an amount larger than the range of this invention, and hence, no satisfactory product could be obtained by injection molding.

The thermoplastic elastomer composition of this invention enables one to improve the flexibility and compression set without impairing the abrasion resistance of a thermoplastic polyester elastomer having excellent mechanical properties, heat resistance and oil resistance.

In other words, the thermoplastic elastomer composition of this invention has an adequate hardness and flexibility and has, in a highly balanced level, physical properties of tensile strength, tensile elongation, compression set, thermal aging resistance, oil resistance, appearance of molded article and abrasion resistance.

Accordingly, the composition of this invention can suitably be used as automobile parts such as joint boots and the like.

What is claimed is:

1. A thermoplastic elastomer composition comprising
   (A) 50–98% by weight of a thermoplastic polyester elastomer which is a polyester block copolymer composed of
   (A-1) a high melting crystalline segment consisting of an aromatic polyester unit and (A-2) a low melting polymer segment consisting of an aliphatic polyether unit and/or an aliphatic polyester unit,
   (B) 50–2% by weight of a rubber which is at least one member selected from the group consisting of acrylonitrile-butadiene copolymer rubber, hydrogenated acrylonitrile-butadiene copolymer rubber, hydrogenated acrylic acid ester-butadiene copolymer rubber, acrylic rubber, ethylene-acrylic acid ester copolymer rubber and ethylene-propylene copolymer rubber, and
   (C) a polyorganosiloxane in an amount of 0.01–10 parts by weight per 100 parts by weight of the total of the components (A) and (B).

2. The composition according to claim 1, wherein the rubber component is subjected to dynamic cross-linking during mixing.

3. The composition according to claim 1, wherein the thermoplastic polyester elastomer (A) has a melting point of 150° C. or more.

4. The composition according to claim 1 or 2, wherein the polyorganosiloxane (C) is in the form of a master batch in which the polyorganosiloxane is previously blended with a resin or rubber, or a blend with a silicone rubbery powder or silica.

5. The composition according to claim 1 or 2, which further contains a compatibilizing agent.

6. The composition according to claim 5, wherein the compatibilizing agent is a compatibilizing agent having an epoxy group or an oxazoline group.

7. The composition according to claim 5, which further contains a plasticizer.

8. The composition according to claim 7, wherein the plasticizer is a phthalic acid ester, a trimellitic acid ester, a polyester plasticizer or a polyetherester plasticizer.

9. The composition according to claim 1, wherein the proportion of the thermoplastic polyester elastomer (A) is 55–85% by weight and the proportion of the rubber (B) is 45–15% by weight.

10. The composition according to claim 1, wherein the amount of the component (C) contained is 0.05–5 parts by weight per 100 parts by weight of the total of the components (A) and (B).

11. The composition according to claim 1, which further contains at least one cross-linking agent selected from the group consisting of sulfur cross-linking agent, aliphatic cross-linking agent and organic peroxide cross-linking agent.

12. The composition according to claim 5, wherein the solubilizing agent is contained in a proportion of 0.5–20 parts by weight per 100 parts by weight of the total of the components (A), (B) and (C).

13. The composition according to claim 7, wherein the plasticizer is contained in a proportion of 1–40 parts by weight per 100 parts by weight of the total of the components (A), (B) and (C).

14. The composition according to claim 1, wherein the rubber (B) is dispersed in the thermoplastic polyester elastomer (A).

15. The composition according to claim 14, wherein the average particle size of the dispersed rubber (B) is 10 μm or less.

* * * * *